United States Patent
Sano

(10) Patent No.: US 11,237,701 B2
(45) Date of Patent: Feb. 1, 2022

(54) NON-TRANSITORY STORAGE MEDIUM WITH FUNCTIONALITY IN RESPONSE TO AN OBJECT AND CHANGE IN CAPACITANCE

(71) Applicant: FUJIFILM BUSINESS INNVOTION CORP., Tokyo (JP)

(72) Inventor: Yasushi Sano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/521,928

(22) Filed: Jul. 25, 2019

(65) Prior Publication Data

US 2019/0346980 A1 Nov. 14, 2019

Related U.S. Application Data

(63) Continuation of application No. 15/661,879, filed on Jul. 27, 2017, now Pat. No. 10,552,003, which is a
(Continued)

(30) Foreign Application Priority Data

Aug. 14, 2012 (JP) .................. 2012-179975

(51) Int. Cl.
*G06F 3/0482* (2013.01)
*G06F 3/044* (2006.01)
(Continued)

(52) U.S. Cl.
CPC ............ *G06F 3/0482* (2013.01); *G06F 3/044* (2013.01); *G06F 3/0488* (2013.01);
(Continued)

(58) Field of Classification Search
CPC ... G06F 3/00; G06F 3/01; G06F 3/017; G06F 3/33; G06F 3/041; G06F 3/048;
(Continued)

(56) References Cited

U.S. PATENT DOCUMENTS 6,661,437 B1   12/2003   Miller et al.
2003/0025676 A1   2/2003   Cappendijk
(Continued)

FOREIGN PATENT DOCUMENTS

CN   101495950 A   7/2009
GN   102109952 A   6/2011
(Continued)

OTHER PUBLICATIONS

Mar. 10, 2016 Office Action Issued in U.S. Appl. No. 13/854,476.
Jan. 19, 2016 Office Action issued in Japanese Patent Application No. 2012-179975.
Jul. 26, 2016 Office Action issued in Japanese Patent Application No. 2012-179975.
(Continued)

*Primary Examiner* — Xiomara L Bautista
(74) *Attorney, Agent, or Firm* — Oliff PLC

(57) ABSTRACT

A display control device includes an operation-display unit and a controller. The operation-display unit hierarchically displays multiple functions using multiple screens and accepts an operation performed through an approach or touch of an object. The controller performs control so that, when the object approaches a function displayed on an original screen, a next screen associated with the function selected as a result of the approach of the object is temporarily displayed using a display mode corresponding to a relationship between the original screen and the next screen.

8 Claims, 11 Drawing Sheets

Related U.S. Application Data continuation of application No. 15/369,275, filed on Dec. 5, 2016, now Pat. No. 9,753,613, which is a continuation of application No. 13/854,476, filed on Apr. 1, 2013, now Pat. No. 9,529,496.

(51) Int. Cl.
  *G06F 3/0488* (2013.01)
  *H04N 1/00* (2006.01)

(52) U.S. Cl.
  CPC ..... *H04N 1/00411* (2013.01); *H04N 1/00432* (2013.01); *H04N 1/00435* (2013.01); *H04N 1/00474* (2013.01); *H04N 2201/0094* (2013.01)

(58) Field of Classification Search
  CPC .... G06F 3/0481; G06F 3/0482; G06F 3/0488; G06F 3/04895; G06F 3/04812; G06F 3/04842; G06F 3/04883; G06F 2203/04804; G06F 15/16; G06F 9/4443; G06G 5/08; G06G 5/14
  See application file for complete search history.

(56) References Cited

U.S. PATENT DOCUMENTS

| | | | |
|---|---|---|---|
| 2004/0066370 | A1 | 4/2004 | Takaku |
| 2006/0209208 | A1 | 9/2006 | Kim et al. |
| 2006/0244733 | A1* | 11/2006 | Geaghan ............... G06F 3/0414 345/173 |
| 2009/0237617 | A1 | 9/2009 | Inoshita |
| 2009/0244023 | A1* | 10/2009 | Kim ...................... G06F 3/0416 345/173 |
| 2009/0289907 | A1 | 11/2009 | Ruscher et al. |
| 2010/0205547 | A1 | 8/2010 | Boegelund et al. |
| 2011/0157006 | A1* | 6/2011 | Miyazawa ............ G06F 3/0488 345/156 |
| 2011/0161849 | A1 | 6/2011 | Stallings et al. |
| 2011/0252298 | A1 | 10/2011 | Johlic et al. |
| 2012/0084691 | A1* | 4/2012 | Yun .................... G06F 3/04842 715/769 |

FOREIGN PATENT DOCUMENTS

| | | |
|---|---|---|
| GN | 102446060 A | 5/2012 |
| JP | 2004-127097 A | 4/2004 |
| JP | 2010-019643 A | 1/2010 |
| JP | 2011134272 A | 7/2011 |
| JP | 2012-008954 A | 1/2012 |

OTHER PUBLICATIONS

"Operations to Change—Farewell to Mouse Click Write and Move Object by Direct Pen Input" Internet magazine, Impress Corporation, vol. 94, p. 110, 2002.
Mar. 23, 2015 Communication issued in Australian Patent Application No. 2013205385.
Jul. 3, 2017 Office Action issued in Chinese Patent Application No. 201310169328.1.
Machine Translation Foreign Patent JP2010-19643.
Aug. 7, 2015 Office Action issued in U.S. Appl. No. 13/854,476.
Aug. 17, 2016 Notice of Allowance issued in U.S. Appl. No. 13/854,476.
Sep. 15, 2016 Notice of Allowance issued in U.S. Appl. No. 13/854,476.
Dec. 19, 2017 Office Action issued in Japanese Patent Application No. 2016-225952.
Dec. 19, 2017 Office Action issued in Australian Application No. 2017202666.
Mar. 6, 2018 Office Action issued in Chinese Patent Application No. 201310169328.1.
Sep. 7, 2018 Office Action issued in Australian Patent Application No. 2017210496.
Aug. 9, 2017 Notice of Allowance issued in U.S. Appl. No. 15/369,275.
Apr. 28, 2017 Notice of Allowance issued in U.S. Appl. No. 15/369,275.
Feb. 28, 2017 Office Action issued in U.S. Appl. No. 15/369,275.
Aug. 15, 2017 Office Action issued in Japanese Patent Application No. 2016-225952.
Nov. 12, 2019 Office Action issued in Japanese Patent Application No. 2019-044804.
Mar. 30, 2020 Office Action issued in Australian Application No. 2019202620.
Jul. 7, 2020 Office Action issued in Chinese Patent Application No. 201711364384.5.
Aug. 27, 2020 Office Action issued in Chinese Patent Application No. 201711364828.5.
Oct. 14, 2020 Office Action issued in Australian Patent Application No. 2019229413.
Apr. 23, 2021 Examination Report issued in Australian Patent Application No. 2019229413.
Apr. 19, 2021 Office Action issued in Chinese Patent Application No. 201711364384.5.
Mar. 29, 2021 Office Action issued in Chinese Patent Application No. 201711364828.5.
Jun. 25, 2021 Office Action issued in Chinese Patent Application No. 201711364828.5.
Aug. 16, 2021 Office Action issued in Chinese Patent Application No. 201811494442.0.

* cited by examiner

FIG. 3
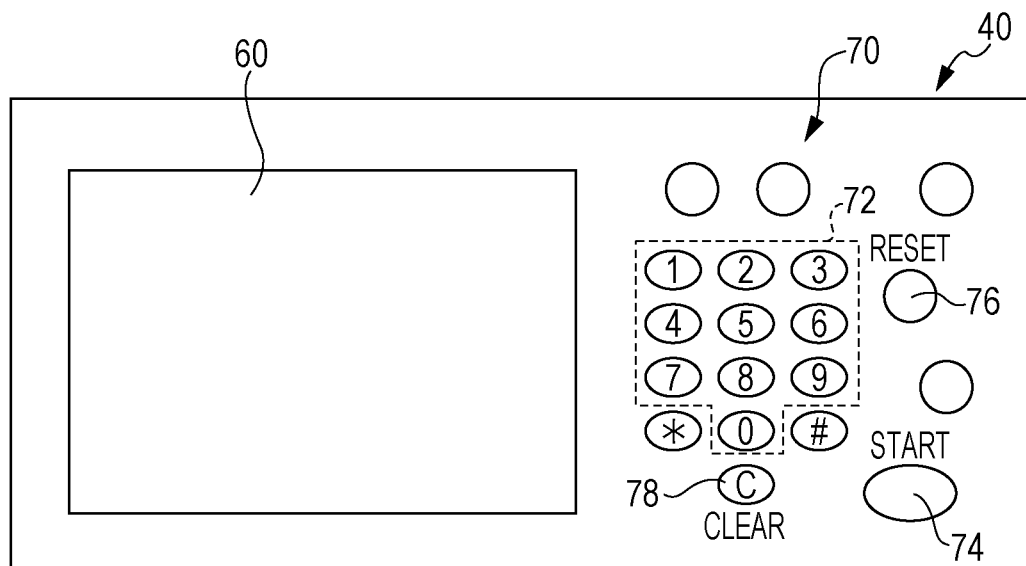
FIG. 4A  FIG. 4B  FIG. 4C  FIG. 4D
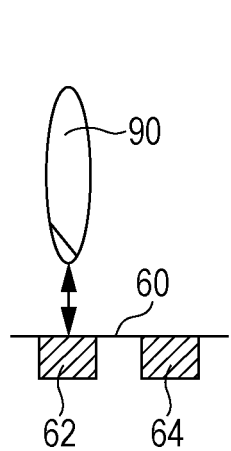 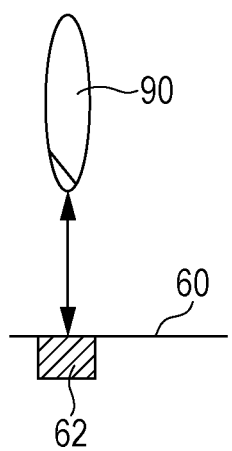 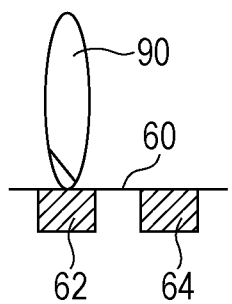 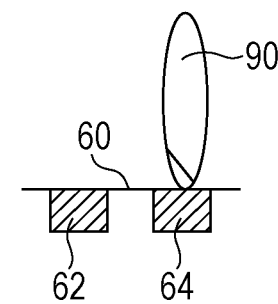

NON-TRANSITORY STORAGE MEDIUM WITH FUNCTIONALITY IN RESPONSE TO AN OBJECT AND CHANGE IN CAPACITANCE

CROSS-REFERENCE TO RELATED APPLICATIONS

This application is a Continuation of U.S. patent application Ser. No. 15/661,879, filed Jul. 27, 2017, which is a Continuation of U.S. patent application Ser. No. 15/369,275, filed Dec. 5, 2016, which is a Continuation of U.S. patent application Ser. No. 13/854,476, filed Apr. 1, 2013, which is based on and claims priority under 35 USC 119 from Japanese Patent Application No. 2012-179975 filed Aug. 14, 2012. The above-noted prior applications are incorporated herein in their entirety.

BACKGROUND

Technical Field

The present invention relates to a display control device, an image forming apparatus, a display control method, and a non-transitory computer readable medium.

Summary

According to an aspect of the invention, there is provided a display control device including an operation-display unit and a controller. The operation-display unit hierarchically displays multiple functions using multiple screens and accepts an operation performed through an approach or touch of an object. The controller performs control so that, when the object approaches a function displayed on an original screen, a next screen associated with the function selected as a result of the approach of the object is temporarily displayed using a display mode corresponding to a relationship between the original screen and the next screen.

BRIEF DESCRIPTION OF THE DRAWINGS

An exemplary embodiment of the present invention will be described in detail based on the following figures, wherein:

FIG. 3 is a plan view illustrating a specific example of a configuration of an operation panel;

FIGS. 4A to 4D are schematic diagrams describing a detection function of a touch panel;

DETAILED DESCRIPTION

An exemplary embodiment of the present invention will be described in detail below with reference to the accompanying drawings.

Image Forming Apparatus

An image forming apparatus according to an exemplary embodiment of the present invention will be described first. The image forming apparatus according to this exemplary embodiment may be a multifunction printer that provides multiple service processes. In this exemplary embodiment, the image forming apparatus provides multiple service processes, which include at least a copy process, a print process, an image reading process, and a facsimile process. Hereinafter, the copy process, the print process, the image reading process, and the facsimile process may be referred to as "copying", "printing", "scanning", and "fax", respectively. Also, the service processes may be simply referred to as "services", such as a copy process being referred to as "copy".

Overall Configuration of Image Forming Apparatus

Figure 1:
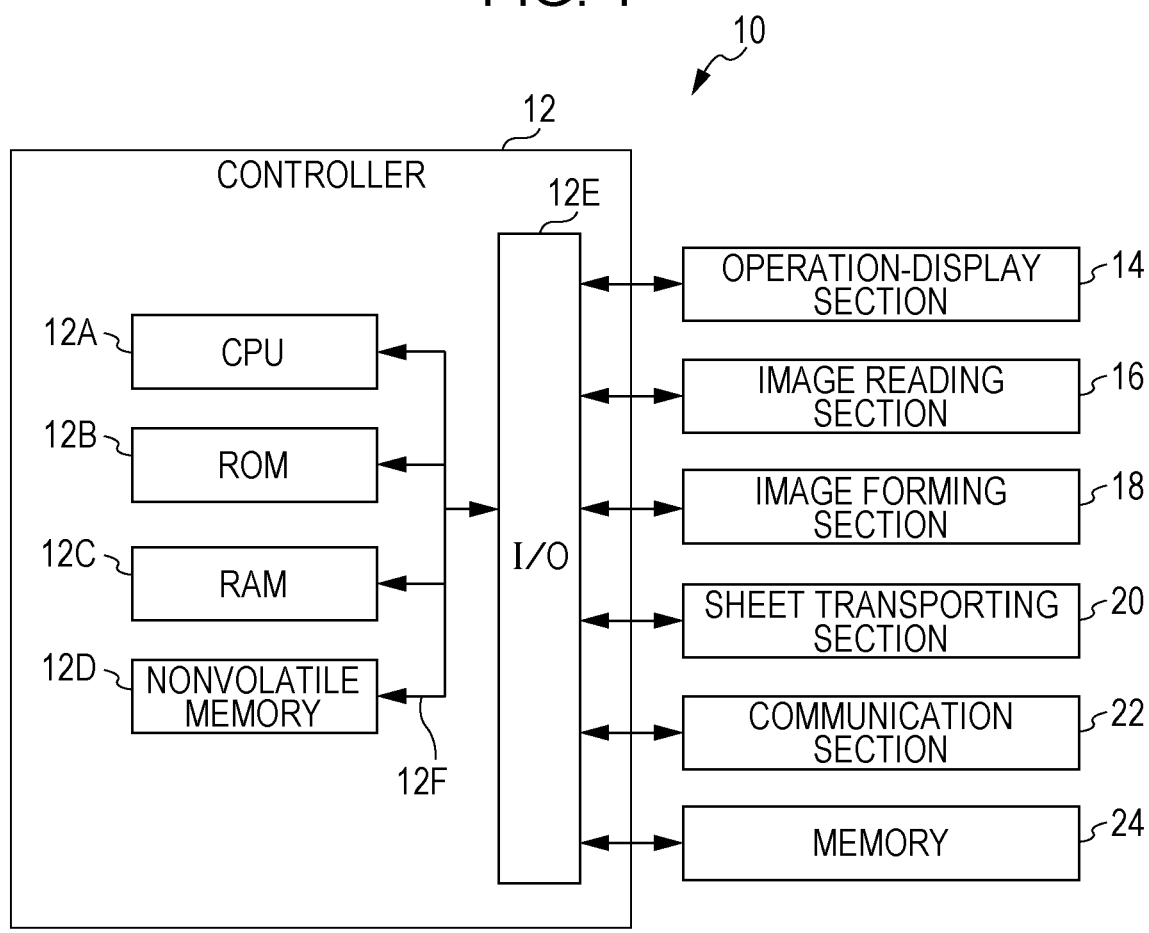
FIG. 1 is a block diagram illustrating an example of a configuration of an image forming apparatus according to an exemplary embodiment of the present invention.

FIG. 1 is a block diagram illustrating an example of a configuration of the image forming apparatus according to the exemplary embodiment of the present invention. As illustrated in FIG. 1, an image forming apparatus 10 includes a controller 12, an operation-display section 14, an image reading section 16, an image forming section 18, a sheet transporting section 20, a communication section 22, and a memory 24. This configuration of the image forming apparatus 10 is merely an example, and thus the configuration and arrangement of the individual components may be changed, such as an unnecessary functional section being removed or a new functional section being added.

The controller 12 is implemented as a computer that controls the image forming apparatus 10 and performs various computations. Specifically, the controller 12 includes a central processing unit (CPU) 12A, a read only memory (ROM) 12B that stores various programs, a random access memory (RAM) 120 that is used as a work area during execution of a program, a nonvolatile memory 12D that stores various pieces of information, and an input/output interface (I/O) 12E. The CPU 12A, the ROM 12B, the RAM 12C, the nonvolatile memory 12D, and the I/O 12E are connected to each other via a bus 12F.

Each of the operation-display section 14, the image reading section 16, the image forming section 18, the sheet transporting section 20, the communication section 22, and the memory 24 is connected to the I/O 12E of the controller 12. The controller 12 exchanges information with each of the operation-display section 14, the image reading section 16, the image forming section 18, the sheet transporting section 20, the communication section 22, and the memory 24 to control the section.

The operation-display section 14 includes various buttons and an operation panel that displays various screens. With these components, the operation-display section 14 accepts operations performed by the user and displays various pieces of information to the user. Details about the configuration of the operation-display section 14 will be described later.

The image reading section 16 includes an image reading device, such as an image sensor, that optically reads an image formed on sheet; and a scanning mechanism that performs a scan on a sheet. With these components, the image reading section 16 reads an image formed on an original document placed at the image reading section 16 and generates image information.

The image forming section 18 is a device that forms an image on a sheet. For example, the image forming section 18 that uses the electrophotographic system to form an image includes an image forming unit and a fixing device. The image forming unit includes a photoconductor drum, a charging device, an exposure device, a developing device, a transfer device, and a cleaning device.

Now, an image forming operation based on the electrophotography will be briefly described. The photoconductor drum is charged by the charging device. The exposure device exposes the charged photoconductor drum to light that is modulated based on image data, thereby forming an electrostatic latent image based on the image data on the photoconductor drum. The developing device develops, using toners, the electrostatic latent image formed on the photoconductor drum. The transfer device transfers the resultant toner image formed on the photoconductor drum onto a sheet. The fixing device fixes the transferred toner image on the sheet.

The sheet transporting section 20 includes a sheet container that holds sheets therein, pickup rollers that pick up a sheet from the sheet container, and transporting rollers that transport a sheet chat has been picked up. With these components, the sheet transporting section 20 transports a sheet picked up from the sheet container to the image forming section 18. The sheet transporting section 20 also transports a sheet on which an image has been formed by the image forming section 18 to a sheet output tray.

The communication section 22 is an interface that communicates with an external apparatus via a wired or wireless communication network. For example, the communication section 22 functions as an interface that communicates with an external apparatus, such as a computer, that is connected thereto via a network, such as a local area network (LAN) or the Internet. For example, the communication section 22 communicates with an external apparatus, such as a computer, so as to acquire image information, image formation information used in image formation, or the like from the external apparatus. The communication section 22 may also acquire various programs, such as application programs, from an external apparatus.

The memory 24 includes a storage device, such as a hard disk drive. The memory 24 stores various programs and various kinds of data, such as log data.

Various drives may be connected to the controller 12. The drives are devices that read data from computer readable portable recording media, such as a flexible disk, a magneto-optical disk, a compact disc-read only memory (CD-ROM), and a Universal Serial Bus (USB) memory, and that write data on the computer readable portable recording media When the various drives are connected, the controller 12 may, load a program recorded on a portable recording medium by using the corresponding drive and may execute the program.

Configuration of Operation-Display Section

Now, a configuration of the operation-display section 14 will be described.

Figure 2:
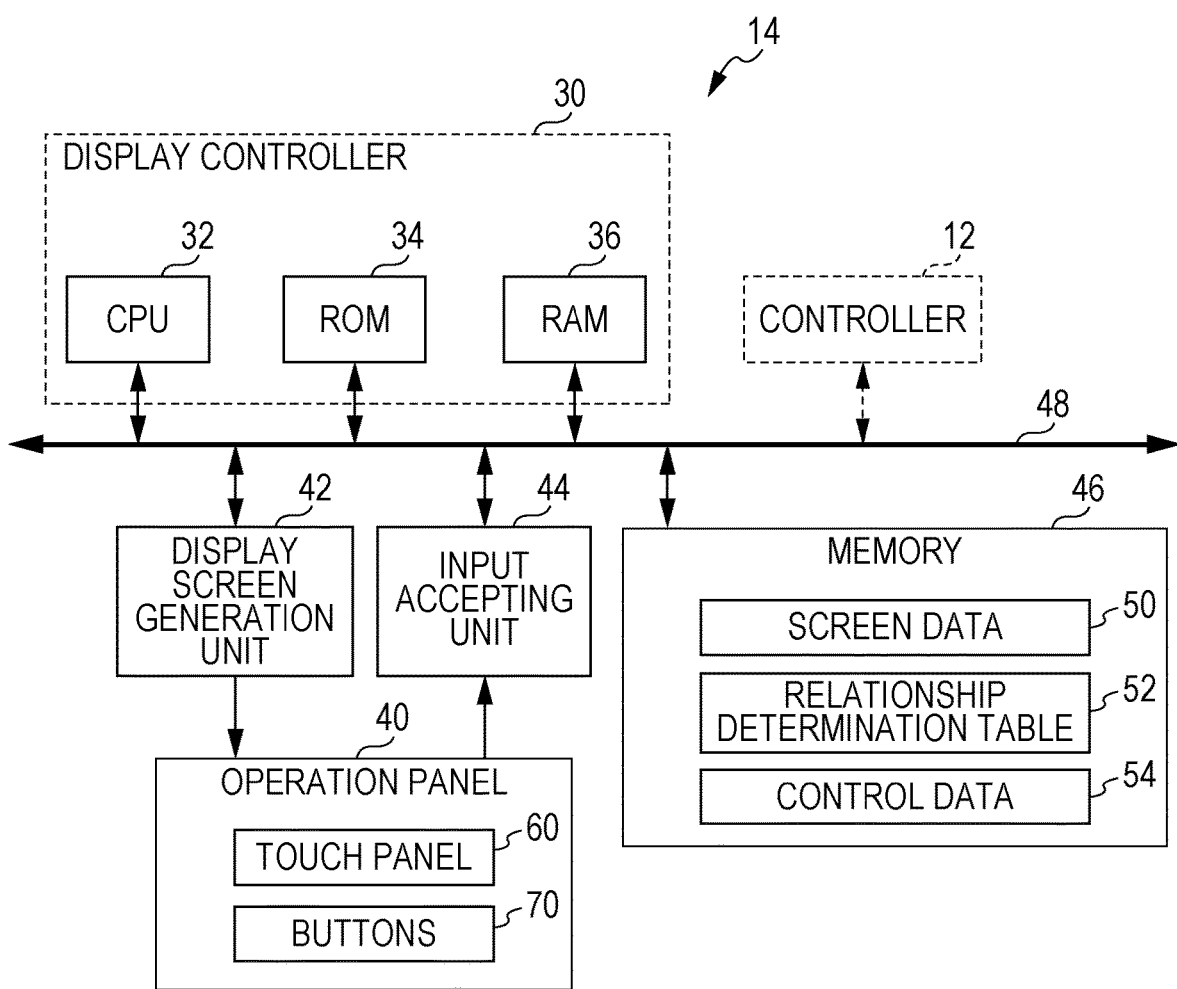
FIG. 2 is a block diagram illustrating an example of a configuration of an operation-display section according to the exemplary embodiment of the present invention.

FIG. 2 is a block diagram illustrating an example of a configuration of the operation-display section 14 according to this exemplary embodiment of the present invention. As illustrated in FIG. 2, the operation-display section 14 includes a display controller 30, an operation panel 40, a display screen generation unit 42, an input accepting unit 44, and a memory 46. As described with reference to FIG. 1 the operation-display section 14 is connected to the controller 12 of the image forming apparatus 10 via the I/O 12E. The configuration of the operation-display section 14 is merely an example, and thus the configuration and arrangement of the individual components may be changed, such as an unnecessary functional unit being removed or a new functional unit being added.

The display controller 30 is implemented as a computer that controls the operation-display section 14 and performs various computations. Specifically, the display controller 30 includes a CPU 32, a ROM 34, and a RAM 36. In this exemplary embodiment, the ROM 34 stores a control program used when a "display control process" described below or the like is executed. The CPU 32 reads the stored program from the ROM 34 and executes the program by using the RAM 36 as a work area. Similarly to the controller 12, the display controller 30 may acquire programs via the communication section 22 and various drives.

Each of the CPU 32, the ROM 34, and the RAM 36 of the display controller 30 is connected to the display screen generation unit 42, the input accepting unit 44, and the memory 46 via a bus 48. The display controller 30 exchanges information with the display screen generation unit 42, the input accepting unit 44, and the memory 46 to control these components.

The operation panel 40 includes a touch panel 60 that includes a liquid crystal display for displaying various screens, and various buttons 70, such as a start button and numeral buttons. In this exemplary embodiment, the touch panel 60 detects whether or not an object is in the vicinity of the touch panel 60 and whether or not an object is in contact with the touch panel 60. Here, examples of the "object" include a user's finger and a writing tool used to perform an operation on the operation panel 40. Details about arrangement of the individual components of the operation panel 40 and the touch panel 60 will be described later. The operation panel 40 is connected to each of the display screen generation unit 42 and the input accepting unit 44.

The display screen generation unit 42 acquires screen data in accordance with an instruction given thereto from the display controller 30, and displays a screen based on the acquired screen data on the operation panel 40. The screen data is stored in the memory 46. The input accepting unit 44 accepts an operation performed by the user on the operation panel 40; identifies a set function, a set value, a pressed button, and so forth; and notifies the display controller 30 of the obtained information.

In response to an instruction for starting a service process, the display controller 30 instructs the controller 12 of the image forming apparatus 10 to execute the service process. Based on the content of the service process, the controller 12 controls the image reading section 16, the image forming section 18, the sheet transporting section 20, the communication section 22, and the memory 24 to execute the service process.

The memory 46 stores various kinds of data In this exemplary embodiment, the memory 46 stores screen data 50, a relationship determination table 52, and control data 54. The screen data 50 includes pieces of data that correspond to various screens to be displayed on the operation panel 40. The operation panel 40 displays a "service selection screen" that displays a list of available services, "setting screens" that hierarchically display settable functions using multiple screens, and so forth. In this exemplary embodiment, the service selection screen is included the setting screens.

The relationship determination table 52 is a table used to identify a relationship between an "original, screen" that displays multiple functions and a "next screen" associated with a selected function. That is, the relationship determination table 52 is a table that represents a relationship among the original screen, the next screen, and the determination result. It is determined based on the relationship determination table 52 whether the relationship between the original screen and the next screen is a relationship in which the next screen is a "lower layer screen" of the original screen, a relationship in which next screen is a "parallel layer screen" of the original screen, or a relationship in which the next screen is an "option displaying screen" of the original screen. For example, in the case where the "original screen" is a basic settings screen and the "next screen" is an image quality adjustments screen, the relationship therebetween is parallel layer screens (see FIGS. 8A to 8D).

The control data 54 includes various kinds of data used when the display controller 30 executes a display control process. The various kinds of data may take a form of set values, tables, graphs, or the like. Examples of the control data 54 include an "initial value of each function" that is used when the set value is initialized.

Operation Panel

Referring now to FIG. 3, an example of the configuration of the operation panel 40 will be described specifically. The operation panel 40 is arranged at an easy-to-operate position for the user, such as on an upper surface of the body of the image forming apparatus 10. As illustrated in FIG. 3, the operation panel 40 includes the touch panel 60 and the buttons 70. Each of the buttons 70 is arranged in the vicinity of the touch panel 60.

The touch panel 60 has a function of a liquid crystal display. The function of a liquid crystal display allows the touch panel 60 to display a screen, such as a setting screen, thereon. When an object approaches or touches an image (a button) displayed on the touch panel 60, a function or the like associated with the image is identified in accordance with position information regarding an area where the approach or touch is detected. That is, an object approaches or touches a function displayed on the screen. Hereinafter, an action in which an object approaches a button representing a function is referred to as "to cress a button halfway", whereas an action in which an object touches a button representing a function is referred to as "to fully press a button".

Examples of a method used by the touch panel 60 to detect an approach or touch of an object include a resistive film method that uses metal thin films that constitute transparent electrodes, an electrostatic capacitance method in which a position is identified by detecting a chance in electrostatic capacitance between the fingertip and a conductive film, an infrared radiation blocking method, and an electromagnetic induction method. The detection method may be any method that enables identification of the position information of the object on the liquid crystal display and is not limited to the above ones.

In this exemplary embodiment, the case of using the touch panel 60 of electrostatic capacitance type will be described. The touch panel 60 of electrostatic capacitance type includes multiple electrostatic sensors arranged in a grid pattern. A detection value changes depending on a change in electrostatic capacitance. When a finger, which is an object, approaches or touches an electrostatic sensor, the detected electrostatic capacitance increases. Each of the multiple electrostatic sensors independently detects electrostatic capacitance. The touch panel 60 outputs the detected electrostatic capacitance values to the input accepting unit 44.

The buttons 70 include numeral buttons 72, a start button 74, a reset button 76, and a clear button 78. The numeral buttons 72 are used by the user to enter a value, such as the number of copies. The start button 74 is used to start execution of each service. The reset button 76 is used to reset the selected service and the set value of each function. The clear button 78 is used to clear the set value of each function. The configuration of the operation panel 40 is merely an example, and thus the configuration and arrangement of the individual components may be changed, such as an unnecessary button being removed or a new button being added.

Detection Function

Referring now to FIGS. 4A to 4D, a detection function of the touch panel 60 will be described. When an object 90 approaches the touch panel 60, detected electrostatic capacitance increases. The input accepting unit 44 detects an approach or touch of the object 90 on the basis of the value of the detected electrostatic capacitance, and outputs a detection signal to the display controller 30. If the change in electrostatic capacitance as smaller than a predetermined lower limit, the approach or touch of the object 90 is not detected and no detection signal is output. If the change in electrostatic capacitance is larger than a predetermined upper limit, a touch of the object 90 is detected and a touch detection signal is output. If the change in electrostatic capacitance is greater than or equal to the predetermined lower limit and is smaller than or equal to the predetermined upper limit, an approach of the object 90 is detected and an approach detection signal is output.

As illustrated in FIG. 4A, when the object 90 approaches a button 62 displayed on the touch panel 60, the button 62 is pressed halfway and a screen (hereinafter, referred to as a "next screen") associated with the button 62 is temporarily displayed on the touch panel 60. Also, when the object 90 approaches a button 64 displayed on the next screen, the button 64 is pressed halfway and a screen associated with the button 64 (hereinafter, referred to as a "following screen") is temporarily displayed on the touch panel 60. The buttons 62 and 64 are buttons representing functions. The user is able to view the multiple hierarchically displayed functions without opening or closing the next screen.

As illustrated in when the object 90 moves away from the button 62 displayed on the touch panel 60, halfway pressing of the button 62 is cancelled. Consequently, the next screen is hidden and the original screen is displayed on the touch panel 60. On the other hand, as illustrated in FIG. 4C, when the object 90 touches the button 62 on the next screen or the original screen, the button 62 is fully pressed and consequently the next screen is displayed in an established manner on the touch panel 60. Also, when the button 62 that represents an option is fully pressed on an option displaying screen, a setting associated with the option is established.

As illustrated in FIG. 4D, when the button 64 is fully pressed as a result of the object 90 touching the button 64 while the next screen as being temporarily displayed on the touch panel 60, the next screen may be displayed in an established manner on the touch panel 60. The button 64 that is fully pressed to establish the displayed screen is not necessarily a button representing a function.

In this exemplary embodiment, the mode of temporarily displaying the next screen is changed in accordance with a relationship of the next screen with respect to the original screen (which is one of a lower layer screen, a parallel layer screen, and an option displaying screen). Examples of the temporarily displaying mode include a full-screen display mode, a superimposition display mode, and a split-screen display mode. A setting screen displayed on the touch panel 60 includes a message display area that displays a message and a screen display area that displays settable functions.

In the "full-screen display mode", the next screen is displayed at the entire screen display area When the next screen is displayed in the full-screen display mode, the selected function may be displayed at the message display area. In the "superimposition display mode", the next screen is displayed at the entire screen display area so as to be superimposed on the original screen. When the next screen is displayed in the superimposition display mode, the selected function may be displayed in an emphasized manner on the original screen. In the "split-screen display mode", the next screen and the original screen are displayed at sub-areas obtained by splitting the screen display area. When the next screen is displayed in the split-screen display mode, the selected function may be displayed in an emphasized manner on the original screen.

Operation Performed by Display Controller

Now, an operation performed by the display controller 30 will be described.

The CPU 32 of the display controller 30 reads out a control program used to execute the "display control process" or the like from the ROM 34 and executes the program by using the RAM 36 as a work area. Here, a description will be given using setting screens of the copy process but the service process is not limited to the copy process. For example, the service process may be the fax process.

Overview of Display Control Process

Figure 5:
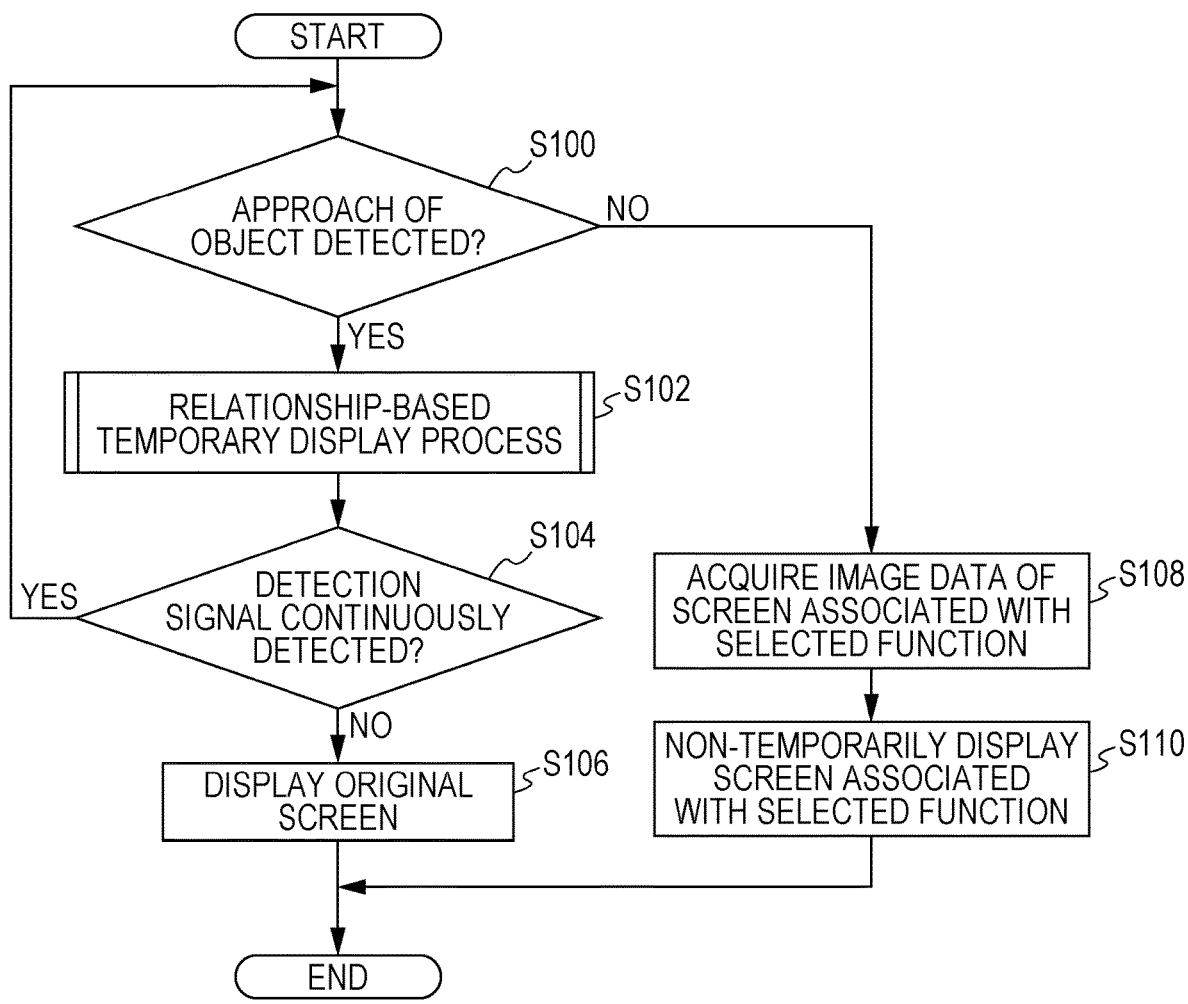
FIG. 5 is a flowchart illustrating a procedure of a display control process.

FIG. 5 is a flowchart illustrating a procedure of the "display control process" according to the exemplary embodiment of the present invention. The display control process starts when a "detection signal" that represents an approach or touch of an object is received. As illustrated in FIG. 5, based on the detection signal, the display controller 30 determines whether or not an approach of the object is detected in step S100. If the approach of the object is detected, the process proceeds to step S102, in which the display controller 30 identifies a function that is selected as a result of the approach of the object.

In step S102, the display controller 30 acquires screen data of a screen (the next screen) associated with the selected function and executes a "relationship-based temporary display process" in which the next screen is temporarily displayed on the touch panel 60. In the relationship-based temporary display process, the next screen is temporarily displayed using a display mode corresponding to the relationship between the original screen and the next screen. On the other hand, if the approach of the object is not detected, a touch of the object is detected and thus the process proceeds to step S108. In step S108, the display controller 30 identifies a function that is selected as a result of the touch of the object.

After the relationship-based temporary display process ends, the process proceeds to step S104, in which the display controller 30 determines whether or not the detection signal is continuously detected. If the detection signal is continuously detected, the process returns to step S100 and the display controller 30 again determines whether or not an approach of the object is detected. If the detection signal is not continuously detected, the process proceeds to step S106, in which the display controller 30 displays the original screen on the touch panel 60 and then terminates the routine.

If the process proceeds to step S108 as a result of detection of the touch of the object, the display controller 30 acquires image data of a screen (the next screen) associated with the selected function in step S108. In step S110, the display controller 30 displays the next screen in an established manner on the touch panel 60 and then terminates the routine.

Relationship-Based Temporary Display Process

Figure 6:
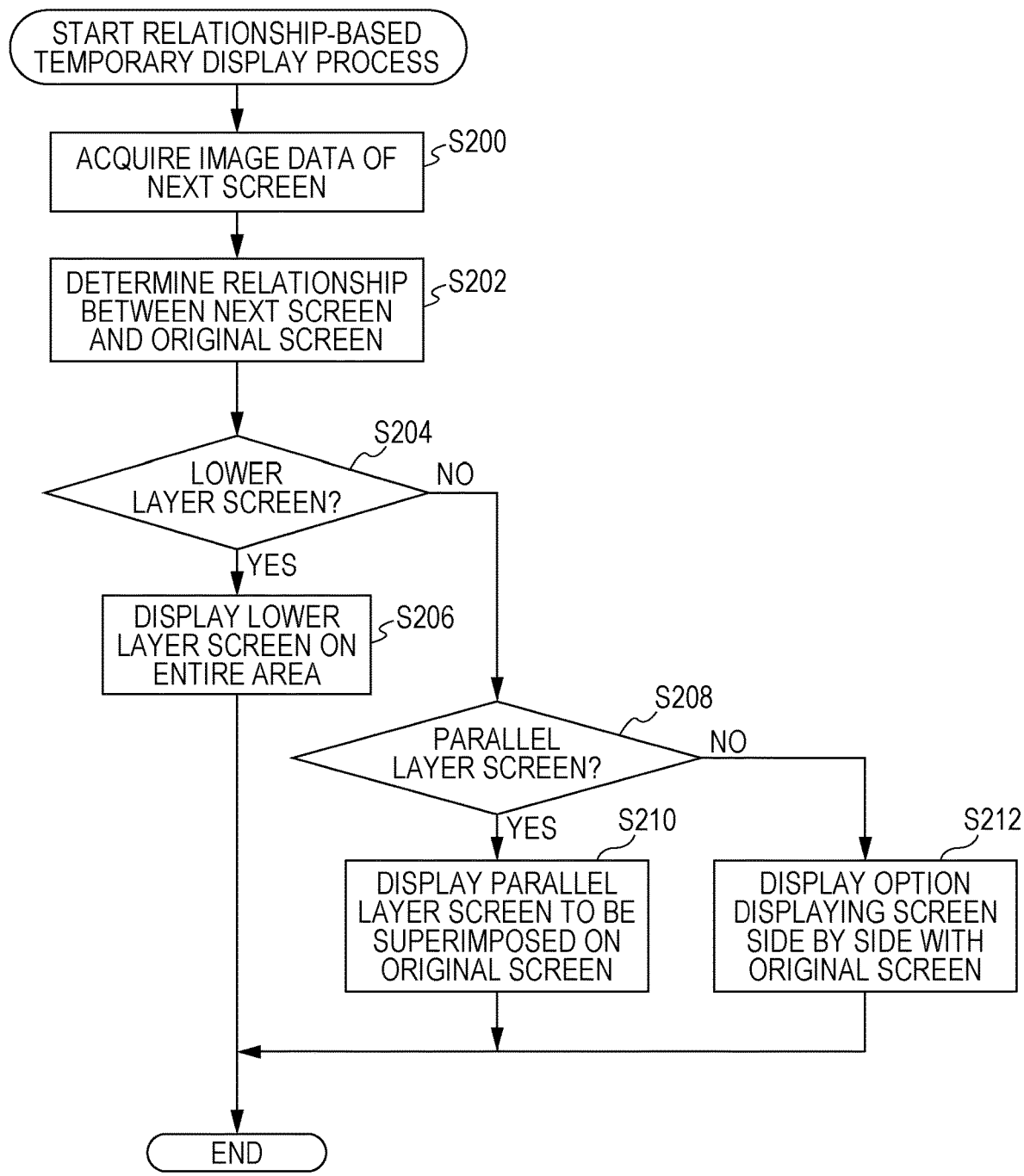
FIG. 6 is a flowchart illustrating a procedure of a relationship-based temporary display process.

FIG. 6 is a flowchart illustrating a procedure of the "relationship-based temporary display process" according to the exemplary embodiment of the present invention. At this point, the function selected as a result of the approach of the object is identified. First, in step S200, the display controller 30 acquires image data of a screen (the next screen) associated with the selected function. Then, in step S202, the display controller 30 determines the relationship between the original screen and the next screen.

Next, in step S204, the display controller 30 determines whether or not the next screen is a lower layer screen on the basis of the determination result. If the next screen is a lower layer screen of the original screen, the process proceeds to step S206. In step S206, the display controller 30 displays the next: screen at the entire screen display area (performs full-screen display) and displays the selected function at the message display area. The display controller 30 then terminates the routine. If the next screen is not a lower layer screen, the process proceeds to step S208.

In step S208, the display controller 30 determines whether or not the next screen is a parallel layer screen on the basis of the determination result. If the next screen is a parallel layer screen of the original screen, the Process proceeds to step S210. In step S210, the display controller 30 displays the next screen at the entire screen display area so as to be superimposed on the original screen (performs superimposition display) and displays the selected function on the original screen in an emphasized manner. The display controller 30 then terminates the routine.

If the next screen is not a parallel layer screen, the next screen is an option displaying screen. Accordingly, the process proceeds to step S212. In step S212, the display controller 30 displays the next screen and the original screen at sub-areas obtained by splitting, the screen display area (performs split-screen display) and displays the selected function on the original screen in an emphasized manner. The display controller 30 then terminates the routine.

Transition to Lower Layer Screen

Now, screen transition performed in the above-described "relationship-based temporary display process" will be described.

Figure 7A:
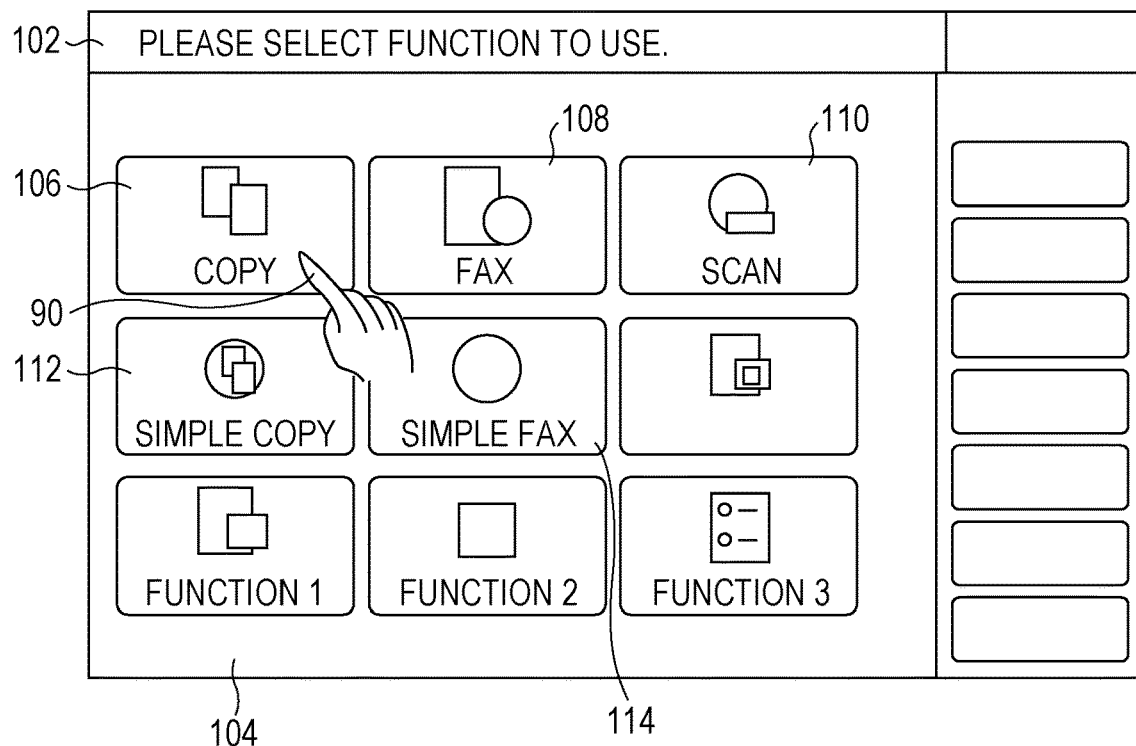
FIGS. 7A to 7D are screen transition diagrams for the case where the next screen is a lower layer screen.

FIGS. 7A to 7D are screen transition diagrams for the case where the next screen is a lower layer screen. FIG. 7A is a schematic diagram illustrating an example of a service selection screen. As illustrated in FIG. 7A, a service selection screen 100 is a screen that displays a list of service processes to be selected and is also called a menu screen. The service selection screen 100 includes a message display area 102 and a screen display area 104. The screen display area 104 displays multiple buttons, which include a copy selection button 106, a fax selection button 108, a scan selection button 110, a simple copy selection button 112, and a simple fax selection button 114.

Figure 7B:
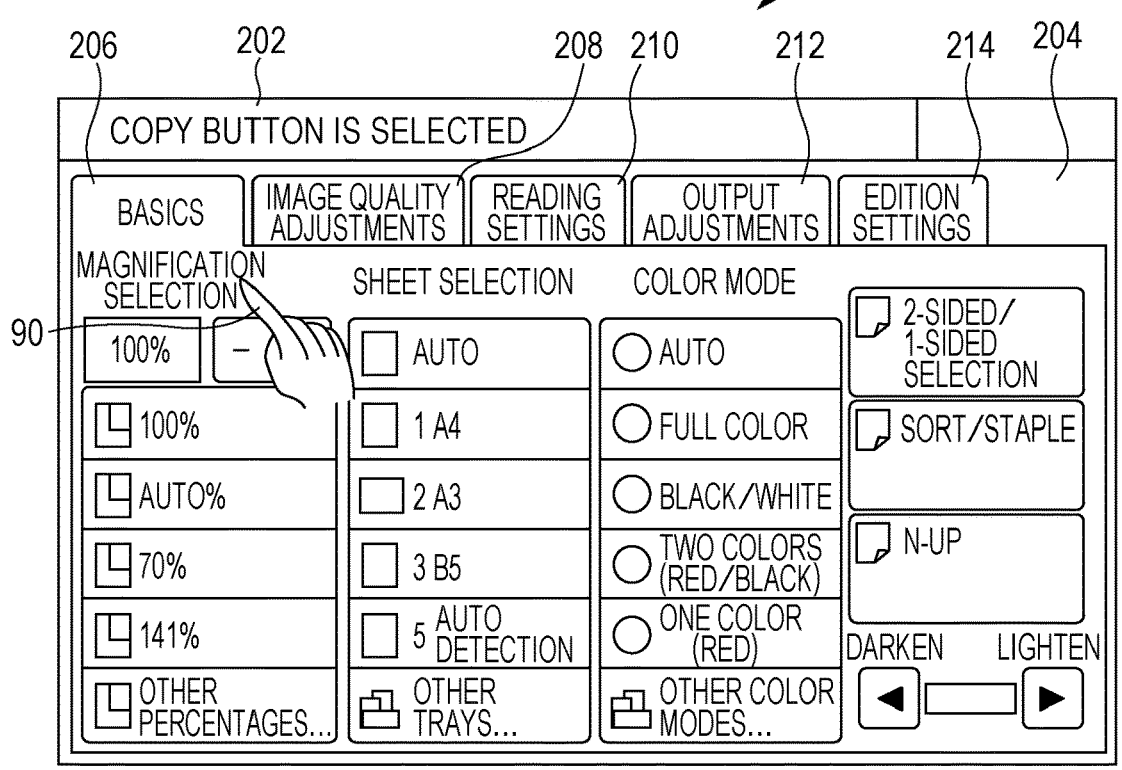

FIG. 7B is a schematic diagram illustrating an example of a setting screen used to perform copying. As illustrated in FIG. 7B, a setting screen 200 includes a message display area 202 and a screen display area 204. The screen display area 204 displays a basic settings screen 206, an image quality adjustments screen 208, a reading settings screen 210, an output adjustments screen 212, and an edition settings screen 214. Each of the basic settings screen 206, the image quality adjustments screen 208, the reading settings screen 210, the output adjustments screen 212, and the edition settings screen 214 has a tab button for displaying the screen, buttons used to set various functions, and value accepting parts that accept set values.

Each of the basic settings screen 206, the image quality adjustments screen 208, the reading settings screen 210, the output adjustments screen 212, and the edition settings screen 214 illustrated in FIG. 78 is a lower layer screen of the screen displayed at the screen display area 104 of the service selection screen 100 illustrated in FIG. 7A. When the object 90 approaches the copy selection button 106 on the service selection screen 100, the copy selection button 106 is pressed halfway.

As a result of the copy selection button 106 being pressed halfway, the basic settings screen 206 that is a lower layer screen is temporarily displayed at the entire screen display area 204 of the setting screen 200. Also, the message display area 202 of the setting screen 200 displays that copy is selected. If the object 90 moves away. from the copy selection button 106 in this state, halfway pressing of the copy selection button 106 is cancelled and the displayed screen returns to the service selection screen 100.

Figure 7C:
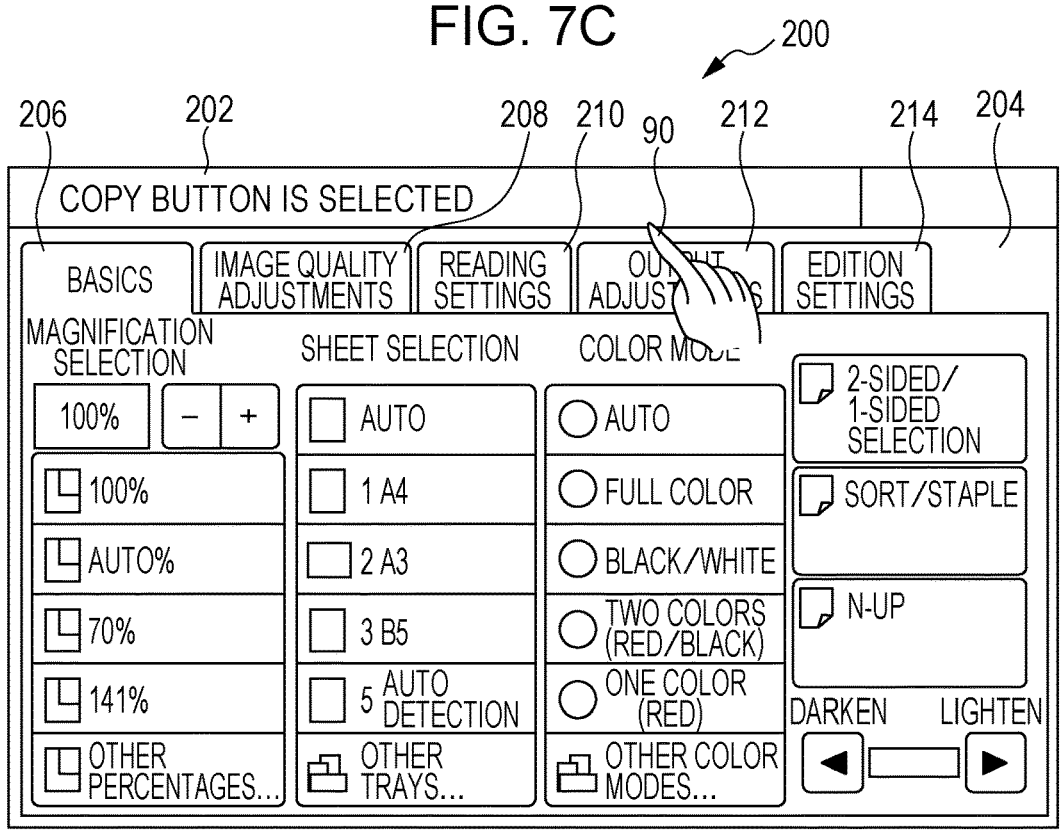
Figure 7D:
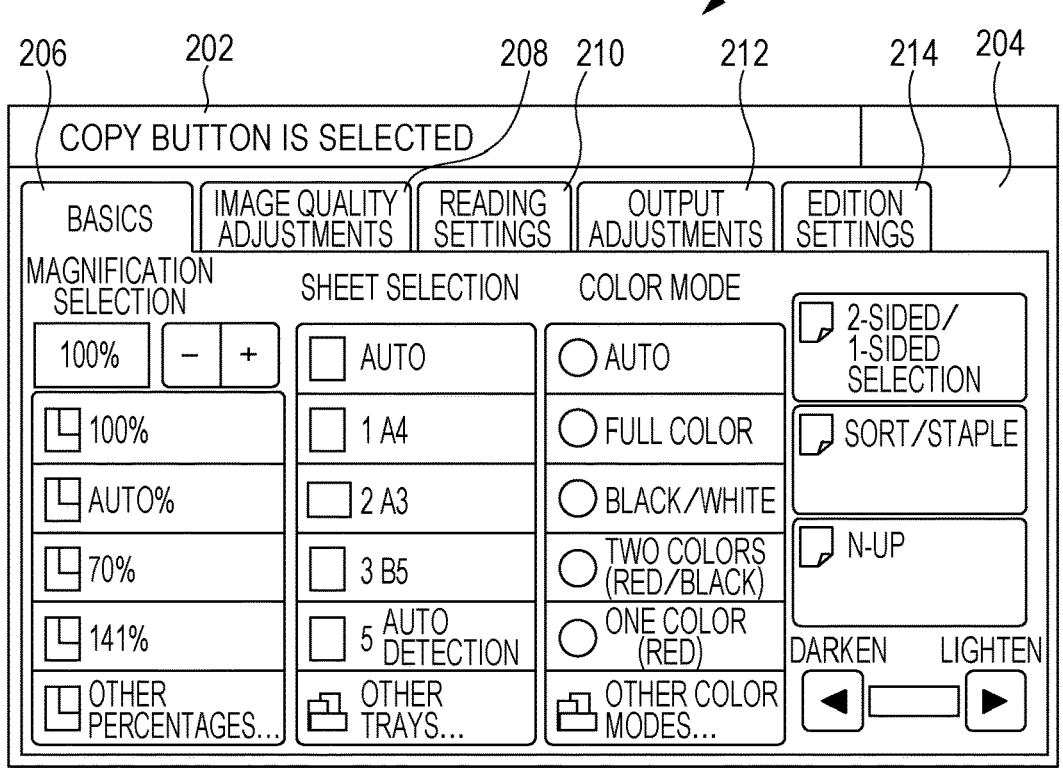

On the other hand, as illustrated in FIG. 70, when the object 90 touches the setting screen 200 with the basic settings screen 206 being temporarily displayed at the screen display area 204, the copy selection button 106 is fully pressed. FIG. 7C illustrates a case where the object 90 touches the message display area 202. As a result of the copy selection button 106 being fully pressed, the basic settings screen 206 that is a lower layer screen is displayed in an established manner at the entire screen display area 204 of the setting screen 200 as illustrated in FIG. 7D.

After the basic settings screen 206 is displayed in an established manner, the displayed screen no longer returns to the service selection screen 100 even if the object 90 moves away from the setting screen 200. That is, transition from the service selection screen 100 that is the "original screen." to the setting screen 200 that is e "next screen" completes. Here, an established screen may be displayed more distinctly than a temporary screen.

Transition to Parallel Layer Screen.

Figure 8A:
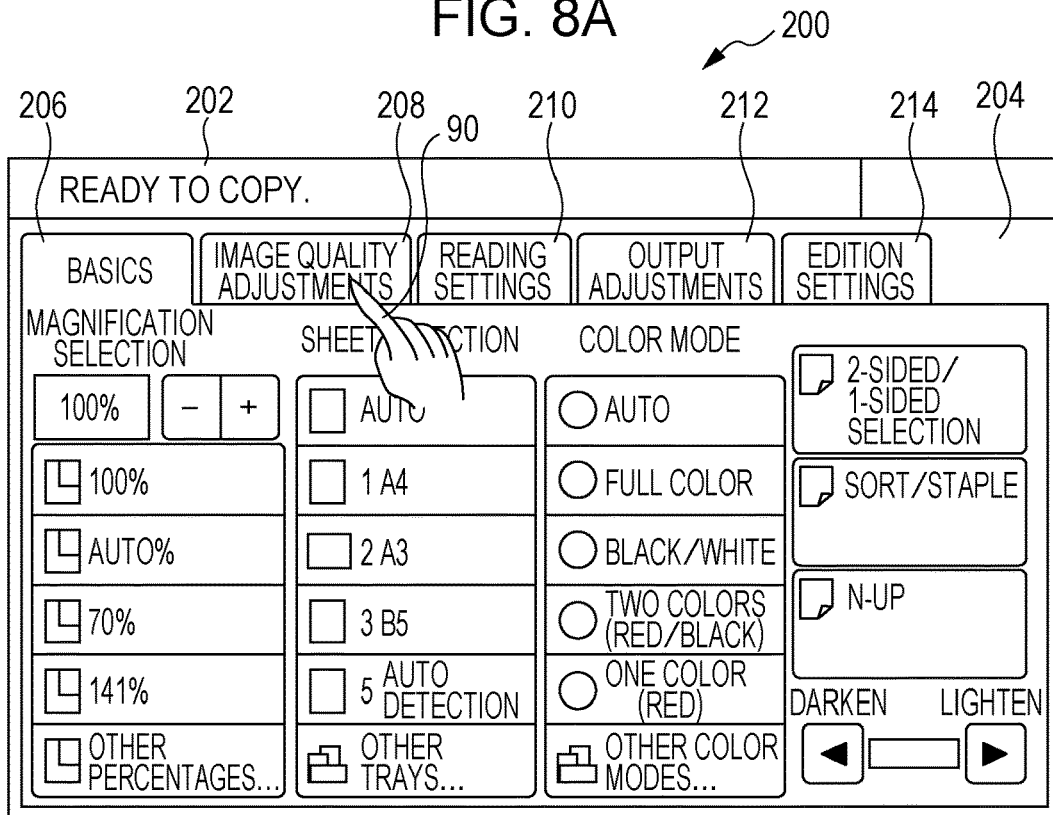
FIGS. 8A to 8D are screen transition diagrams for the case where the next screen is a parallel layer screen.

FIGS. 8A to 8D are screen transition diagrams for the case where the next screen is a parallel layer screen. FIG. 5A is a schematic diagram illustrating an example of the setting screen 200 used to perform copying. As illustrated in FIG. 8A, the screen display area 204 of the setting. screen 200 displays the basic settings screen 206.

Figure 8B:
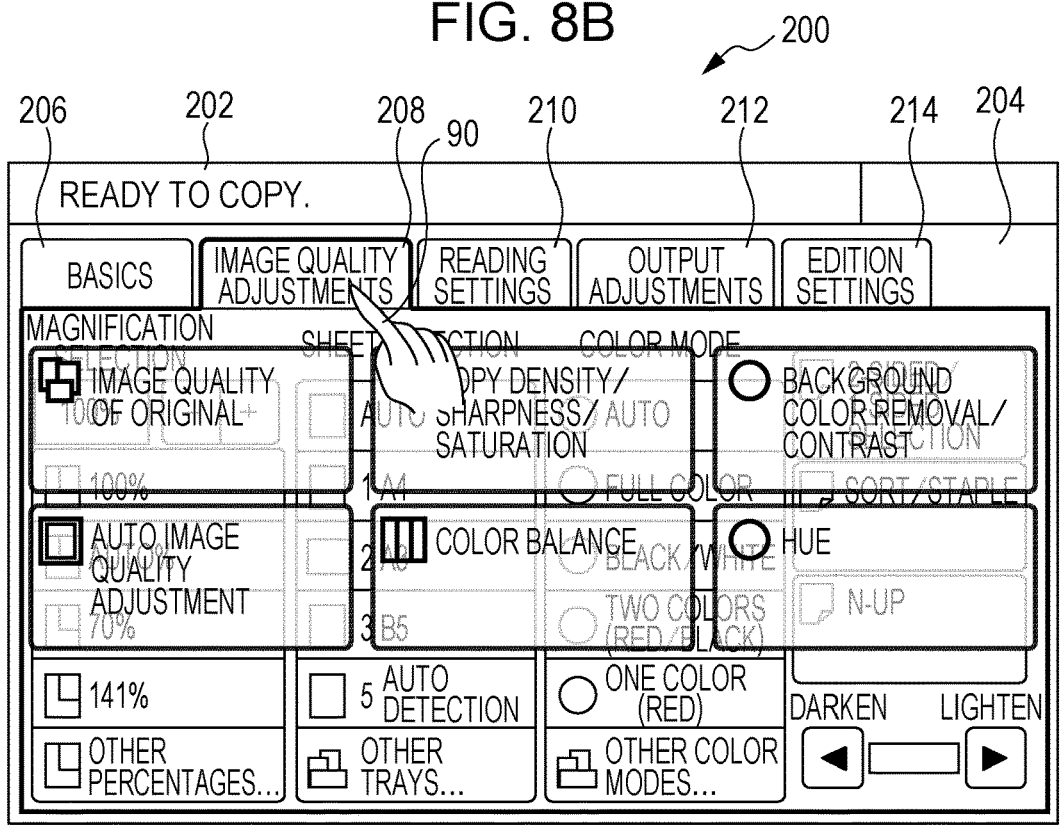

Each of the image quality adjustments screen 208, the reading settings screen 210, the output adjustments screen 212, and the edition settings screen 214 is a parallel layer screen of the basic settings screen 206. As illustrated in FIG. 8B, when the object 90 approaches the tab button used to display the image quality adjustments screen 208 on the setting screen 200, the tab button is pressed halfway.

As a result of the tab button being pressed halfway, the image quality adjustments screen 208 that is a parallel layer screen is temporarily displayed so as to be superimposed on the basic settings screen 206 displayed at the screen display area 204. The image quality adjustments screen 208 is temporarily displayed so as to be superimposed on the basic settings screen 206 so that the basic settings screen 206 located below is seen therethrough. Also, the tab button used to display the image quality adjustments screen 208 is displayed in an emphasized manner, such as by changing t color or thickening the line. Alternatively, the temporarily displayed image quality adjustments screen 208 may be displayed less distinctly than the basic settings screen 206. If the object 90 moves away from the tab button in this state, halfway pressing of the tab button is cancelled and the displayed screen returns to the basic settings screen 206.

Figure 8C:
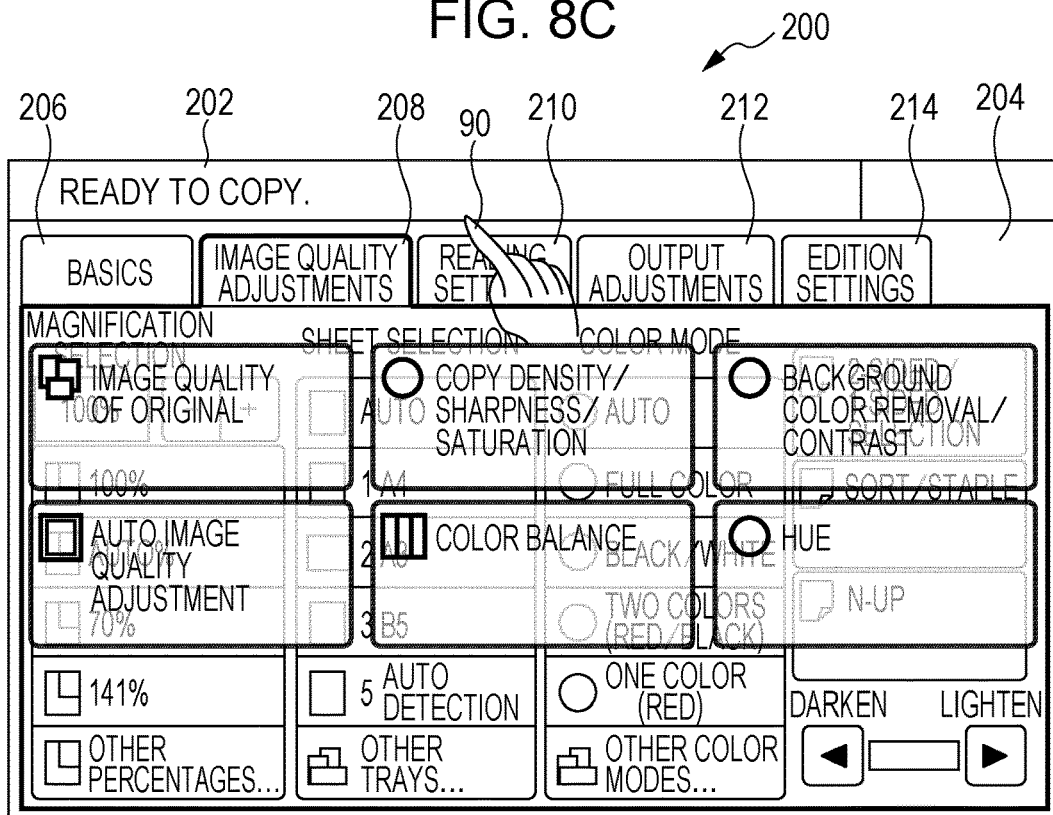
Figure 8D:
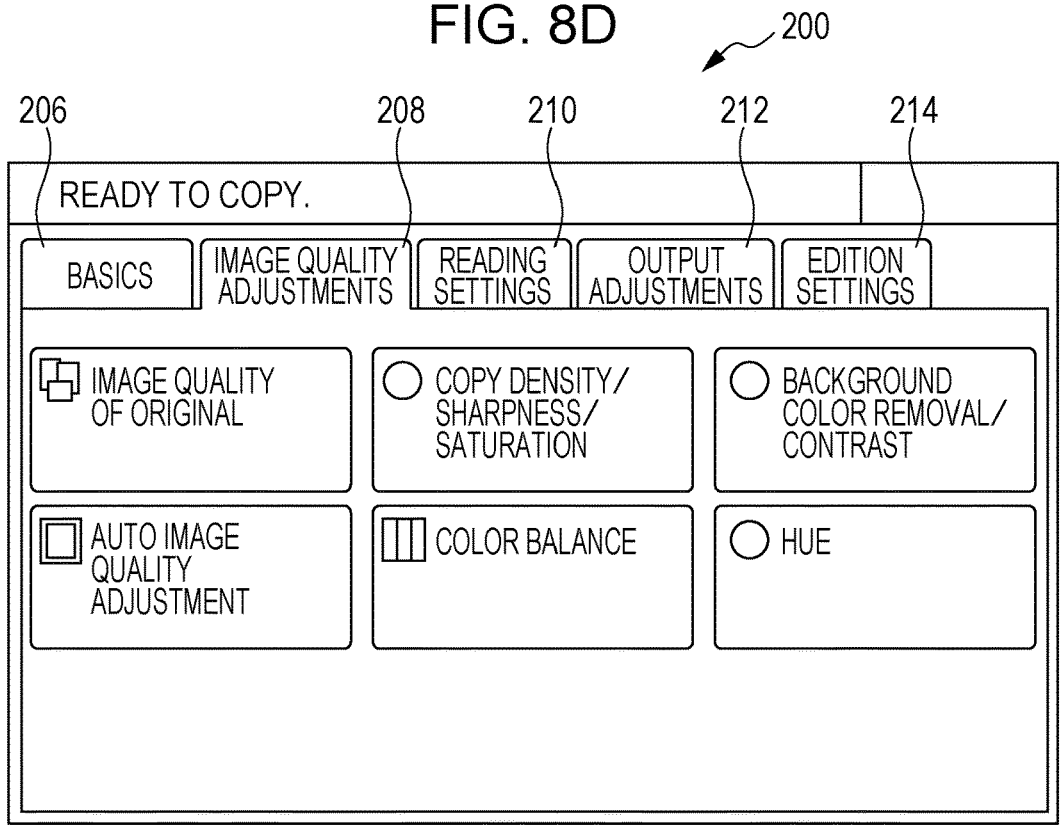

On the other hand, as illustrated in FIG. 8C, when the object 90 touches the setting screen 200 with the image quality adjustments screen 208 being temporarily displayed at the screen display area 204, the tab button used to display the image quality adjustments screen 208 is fully pressed. FIG. 8C illustrates a case where the object 90 touches the message display area 202. As a result of the tab button being fully pressed, the image quality adjustments screen 208 that is a parallel layer screen is displayed in an established manner at the entire screen display area 204 of the setting screen 200 as illustrated in FIG. 8D.

After the image quality adjustments screen 208 is displayed in an established manner, the displayed screen no longer returns to the basic settings screen 206 even if the object 90 moves away from the setting screen 200. That is, transition from the basic settings screen 206 that is the "original screen" to the image quality adjustments screen 208 that is the "next screen" completes. Here, an established screen may be displayed more distinctly than a temporary screen.

Transition to Option Displaying Screen

Figure 9A:
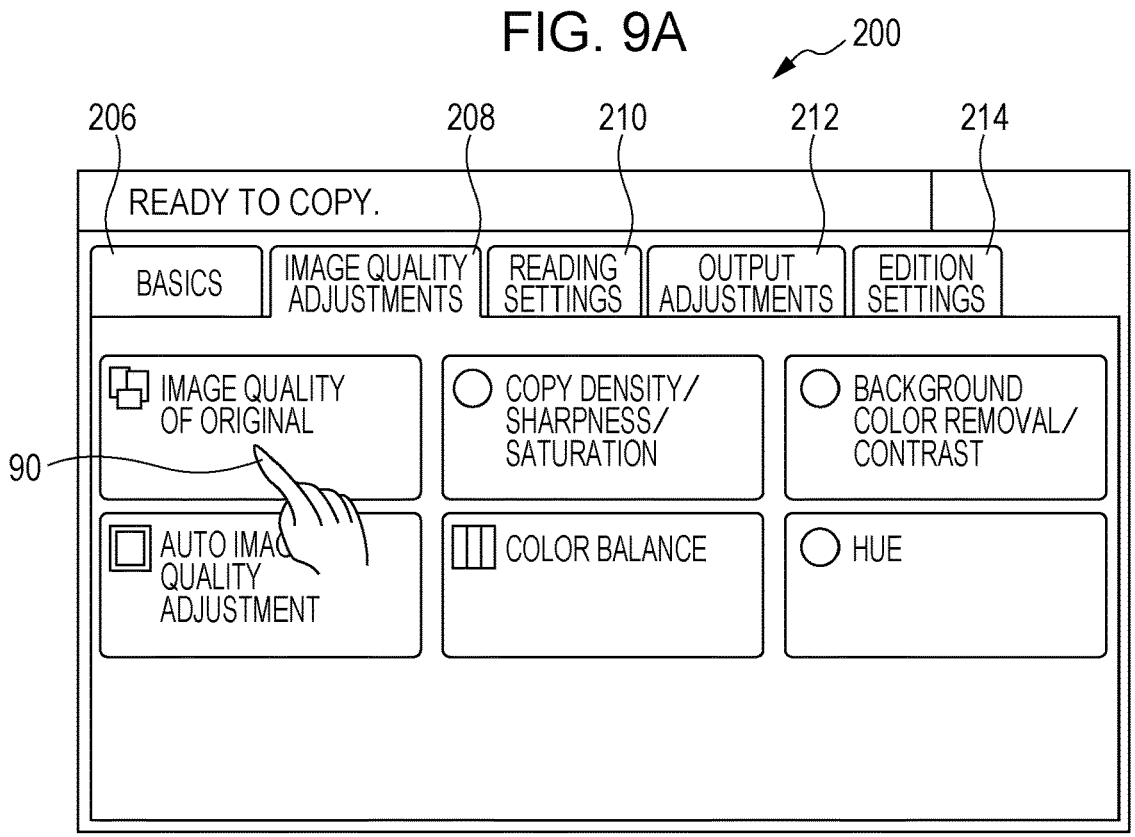
FIGS. 9A to 9D are screen transition diagrams for the case where the next screen is an option displaying screen.

FIGS. 9A to 9D are screen transition diagrams for the case where the next screen is an option displaying screen. FIG. 9A is a schematic diagram illustrating an example of the se ting screen 200 used to perform copying. As illustrated in FIG. 9A, the screen display area 204 of the setting screen 200 displays the image quality adjustments screen 208. The image quality adjustments screen 208 displays multiple buttons, which include an "original image quality" selection button, a "copy density" selection button, a "background color removal" selection button, an "image quality adjustment" selection button, a "color balance" selection button, and a "hue" selection button.

Figure 9B:
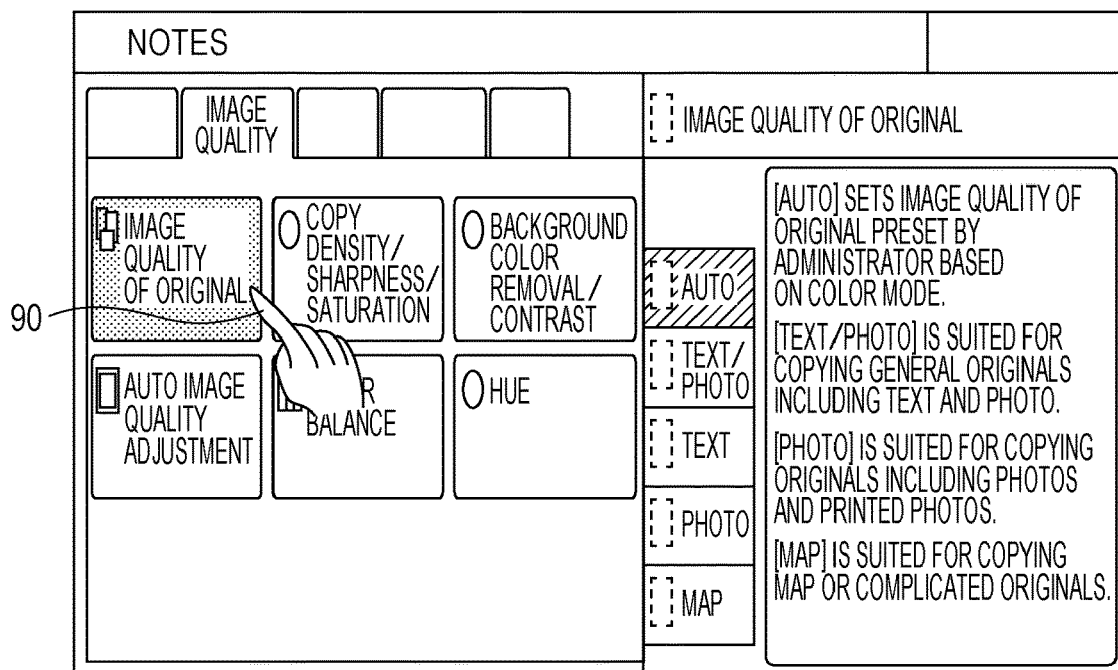

A sub-screen illustrated on the right in FIG. 9B is an option displaying screen that displays options associated with the "original image quality" selection function displayed on the image quality adjustments screen 208 illustrated in FIG. 9A. As illustrated in FIG. 9B, when the object 90 approaches the "original image quality" selection button on the setting screen 200, the "original image quality" selection button is pressed halfway.

As a result of the "original image quality" selection button being pressed halfway, the screen display area 204 is split into two sub-areas and the image quality adjustments screen 208 and the option displaying screen are displayed side by side in the screen display area 204. Also, the "original image quality" selection button used to display the option displaying screen is displayed in an emphasized manner, such as changing the color or thickening the line. Furthermore, the message display area 202 displays conflict information indicating that functions are not settable concurrently. The temporarily displayed option displaying screen may be displayed less distinctly than the image quality adjustments screen 208. If the object 90 moves away from the "original image quality" selection button in this state, halfway pressing of the "original image quality" selection button is cancelled and the displayed screen returns to the image quality adjustments screen 208.

Figure 9C:
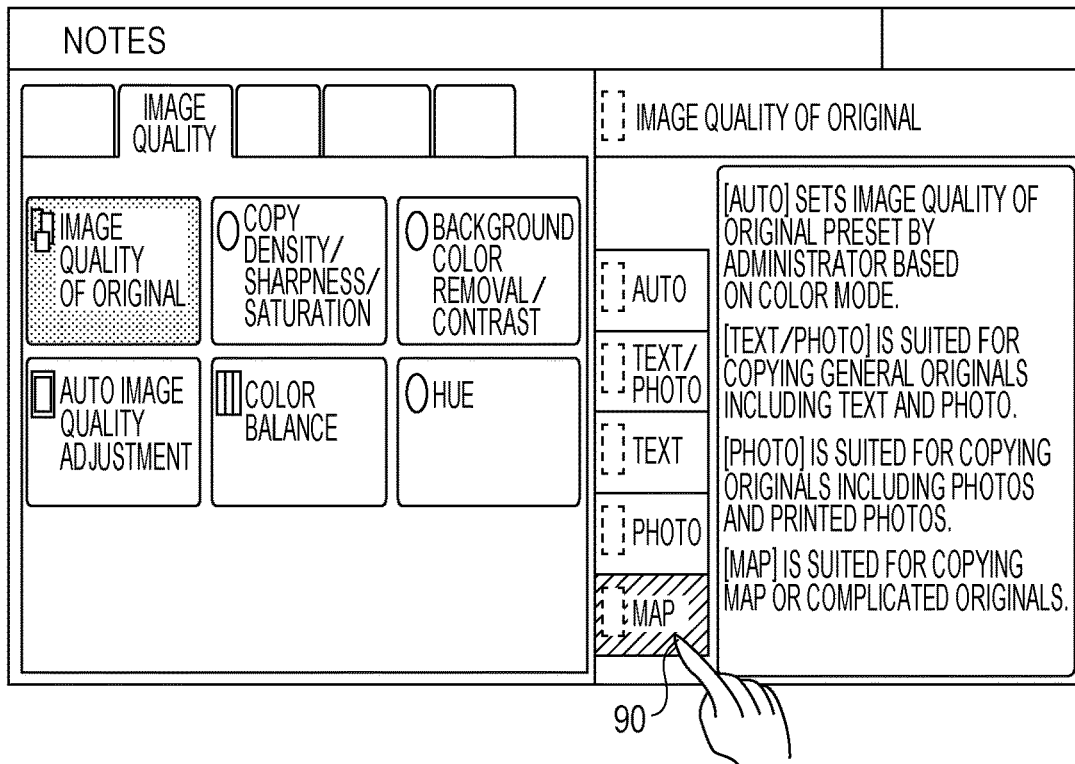
Figure 9D:
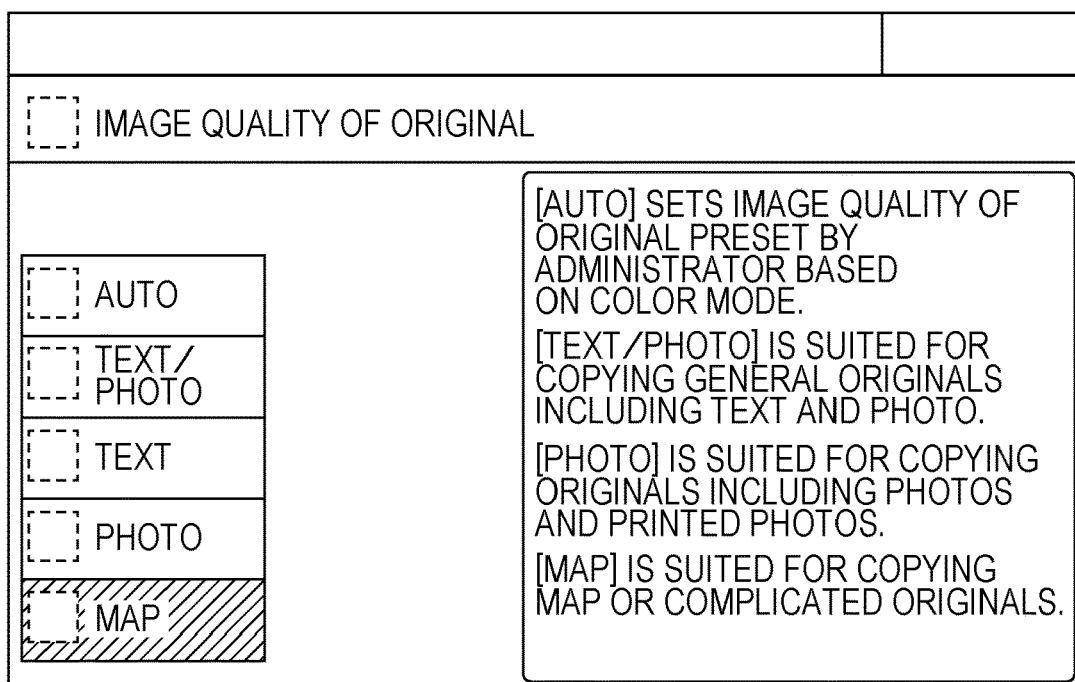

On the other hand, as illustrated in FIG. 9C, when the object 90 touches an option displayed on the option displaying screen with the option displaying screen being temporarily displayed at the screen display area 204, the "option" selection button is fully pressed. FIG. 9O illustrates a case where the object 90 touches a selection button for selecting the option "map". As a result of the "option" selection button being fully pressed, the option displaying screen is displayed in an established manner at the entire screen display area 204 of the setting screen 200 as illustrated in FIG. 9D. At the same time, the selected setting is established. In this example, a value "map" is set for the "original image quality" setting function.

After the option displaying screen is displayed in an established manner, the displayed screen no longer returns to the image quality adjustments screen 208 even if the object 90 moves away from the setting screen 200. That is, transition from the image quality adjustments screen 208 that is the "original screen" to the option displaying screen that is the "next screen" completes. Here, an established screen may be displayed more distinctly than a temporary screen.

Modifications

The configurations of the display control device, the image forming apparatus, and the program described in the above-described exemplary embodiment are merely examples and obviously the configurations thereof may be modified within the scope that does not depart from the gist of the present invention.

For example, in the exemplary embodiment described above, the example has been described in which full-screen display is performed when the next screen is a lower layer screen of the original screen, superimposition display is performed when the next screen is a parallel layer screen of the original screen, and split-screen display is performed when the next screen is an option displaying screen of the original screen. However, the combinations of the temporarily displaying mode and the relationship between the original screen and the next screen are not limited to this example. Each of the lower layer screen, the parallel layer screen, and the option displaying screen may be used in combination with any of the full-screen display mode, the superimposition display mode, and the split screen display mode.

Also, in the exemplary embodiment described above, screen transition regarding a single next screen has been described but the number of next screens may be multiple.

When multiple buttons displayed on the original screen are pressed halfway, multiple next screens are temporarily displayed. When a button displayed on the next screens is pressed halfway, the following screen is temporarily displayed. In this case, the multiple next screens and the original screen may be displayed side by side. That is, the screen display area may be split into multiple sub-areas in accordance with the number of next screens.

Additionally, in the exemplary embodiment described above, the example of acquiring screen data of the next screen to perform full-screen display, superimposition display, or split-screen display has been described. Specifically screen data of the next screen and screen data of the original screen are combined to generate display screen data so that an intended image is displayed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art, The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for hierarchically displaying a plurality of buttons using a plurality of screens on a display, the process comprising:
   displaying an original screen including a button;
   detecting a change in electrostatic capacitance using a touch panel;
   when the touch panel detects that an object selects the button and the change in electrostatic capacitance is greater than or equal to a predetermined lower limit and smaller than or equal to a predetermined upper limit, temporarily displaying a next screen associated with the button while simultaneously displaying an entirety of the original screen; and
   when the touch panel detects that the object selects the temporarily displayed next screen and the change in electrostatic capacitance is larger than the predetermined upper limit, transitioning the original screen to a next screen associated with the temporarily displayed next screen.

2. The non-transitory computer readable medium of claim 1, wherein the temporarily displayed next screen is superimposed on the original screen so that the original screen can be seen therethrough.

3. The non-transitory computer readable medium of claim 1, wherein the process comprises:
   when the touch panel detects that the object selects the button and the change in electronic capacitance is greater than or equal to the predetermined lower limit and smaller than or equal to the predetermined upper limit, temporarily splitting the display into a first region and a second region, displaying the entirety of the original screen in the first region, and displaying the next screen associated with the button in the second region.

4. The non-transitory computer readable medium of claim 1, wherein the original screen is transitioned to the next screen when the touch panel detects that the object selects the temporarily displayed next screen and the change in electrostatic capacitance is larger than the predetermined upper limit in an area of the temporarily displayed next screen on the touch panel.

5. An information processing apparatus for hierarchically displaying a plurality of buttons using a plurality of screens, the apparatus comprising:
- a display that displays an original screen including a button;
- a touch panel that detects a change in electrostatic capacitance; and
- a processor programmed to:
- when the touch panel detects that an object selects the button and the change in electrostatic capacitance is greater than or equal to a predetermined lower limit and smaller than or equal to a predetermined upper limit, instruct the display to temporarily display a next screen associated with the button while simultaneously displaying an entirety of the original screen; and
- when the touch panel detects that the object selects the temporarily displayed next screen and the change in electrostatic capacitance is larger than the predetermined upper limit, instruct the display to transition the original screen to a next screen associated with the temporarily displayed next screen.

6. The information processing apparatus of claim 5, wherein the temporarily displayed next screen is superimposed on the original screen so that the original screen can be seen therethrough.

7. The information processing apparatus of claim 5, wherein the processor is programmed to:
- when the touch panel detects that the object selects the button and the change in electronic capacitance is greater than or equal to the predetermined lower limit and smaller than or equal to the predetermined upper limit, instruct the display to temporarily split the display into a first region and a second region, display the entirety of the original screen in the first region, and display the next screen associated with the button in the second region.

8. The information processing apparatus of claim 5, wherein the original screen is transitioned to the next screen when the touch panel detects that the object selects the temporarily displayed next screen and the change in electrostatic capacitance is larger than the predetermined upper limit in an area of the temporarily displayed next screen on the touch panel.

* * * * *